Sept. 18, 1956 E. J. BARTH ET AL 2,763,159
AIR ASSIST GEAR SHIFT
Filed May 4, 1955 3 Sheets-Sheet 3

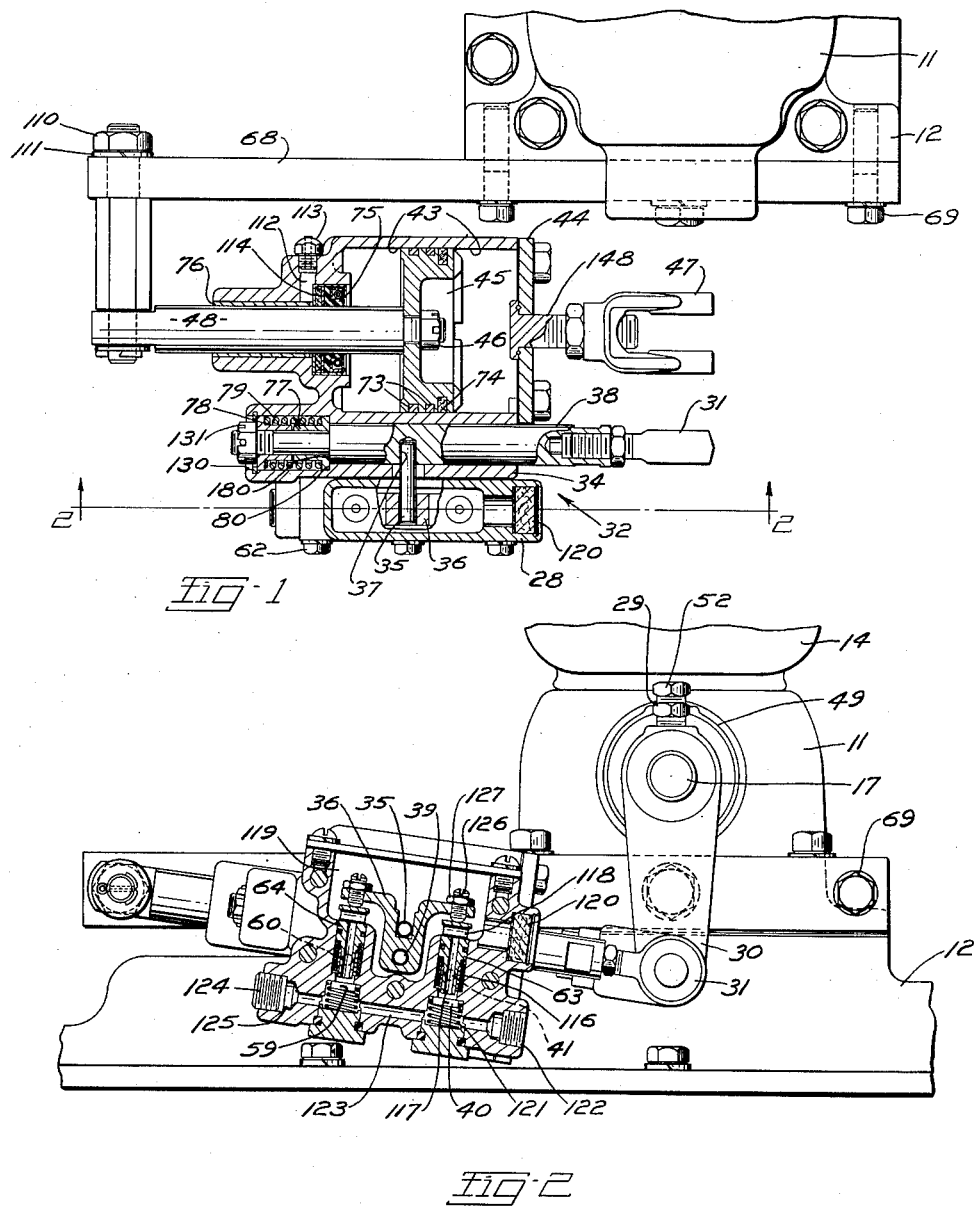

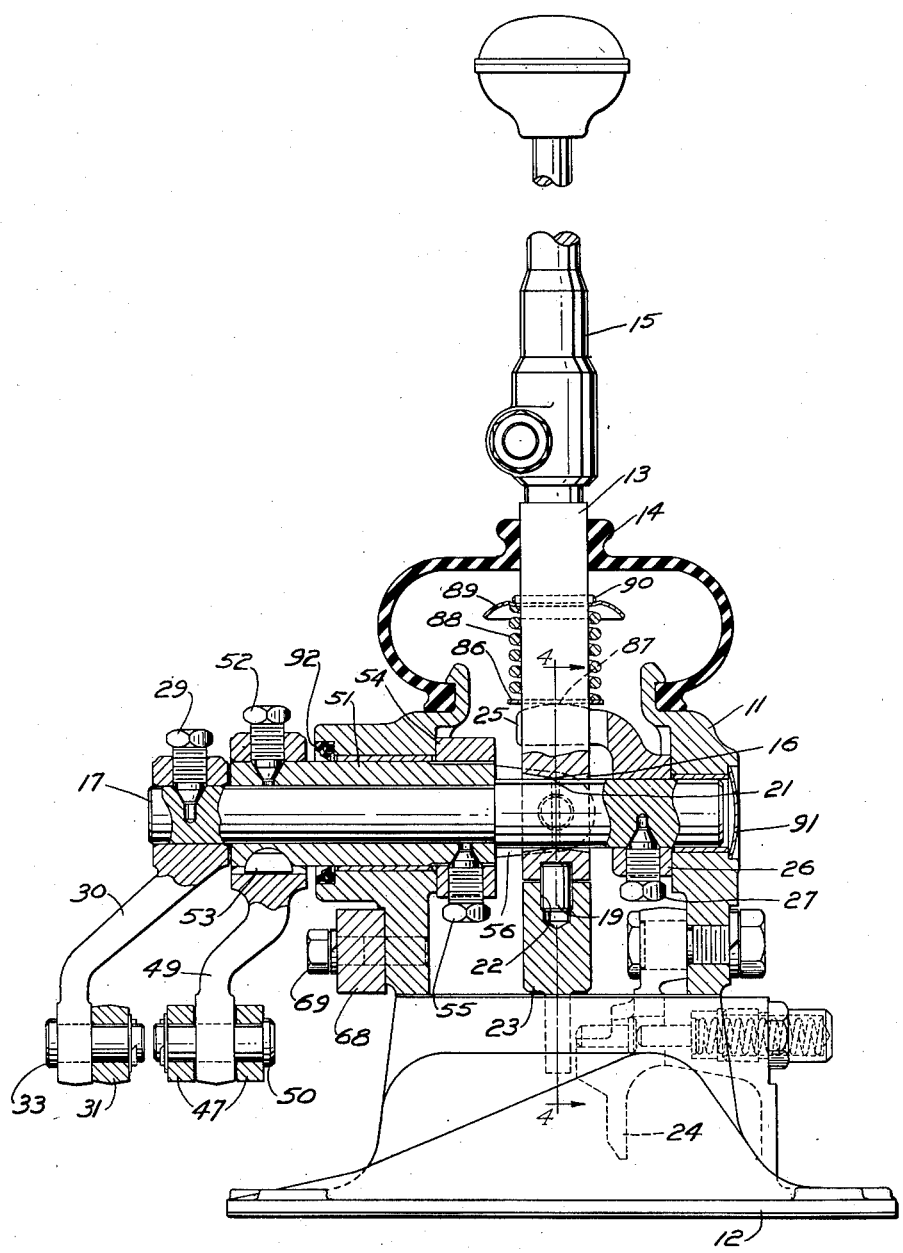

INVENTORS
ELMER J. BARTH &
CARL J. GUSTAFSSON
BY
Lawrence C. Witker
ATTY.

United States Patent Office 2,763,159
Patented Sept. 18, 1956

2,763,159

AIR ASSIST GEAR SHIFT

Elmer J. Barth and Carl J. Gustafsson, Toledo, Ohio, assignors to Dana Corporation, Toledo, Ohio, a corporation of Virginia Application May 4, 1955, Serial No. 505,944

7 Claims. (Cl. 74—335)

This invention relates to transmission controls and is concerned primary with gear shifting mechanism for the gearing of automobiles and other vehicles. The primary object of the invention is to provide power means to assist in completing a shift into any gear by which means the gear to be used and the movement toward that gear is the choice of the operator, and he is in full control of the shift at all times.

Figure 1 is a plan view of this invention including the air assister shift cylinder assembly mounted on the transmission housing cover.

Figure 2 is a side elevation of the air assister mechanism taken substantially along line 2—2 of Figure 1 and connected to the shifting members.

Figure 3 is a sectional view of the shafts and shifter housing cover assembly.

Figure 4:
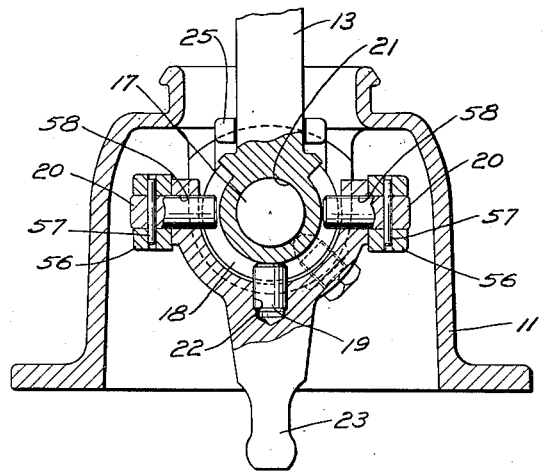
Figure 4 is a side view of the shifter housing cover showing the shift finger, shift lever and connecting pins and brackets taken substantially on line 4—4 of Figure 3.

In Figs. 1 and 2, the cylinder is shown for a right hand mounting in contrast to the left hand mounting of Figure 3. The front of the transmission is on the right side of the page containing these first two views.

In all views like parts are identified by like numerals.

In the following description, the numeral 11 represents the shifter housing cover and 12 the transmission shifter housing to which the shifter housing cover may be secured in any suitable manner. A shift lever 13 extends upward through a flexible boot 14 and can be fitted with any length extension 15. The lever 13 has a bell mouthed opening 16 through which the operating shaft 17 passes. A slot 18 is also in the lever 13 to permit longitudinal movement about the lever pin 19 and the bracket pins 20; the bracket pins 20 are so located as to permit the lever 13 to pivot about the operating shaft 17 on the ridge 21.

The lever pin 19 is located in a hole 22 in the shift finger 23 whereby lateral movement of the lever 13 is transmitted to the finger 23.

Figure 5:
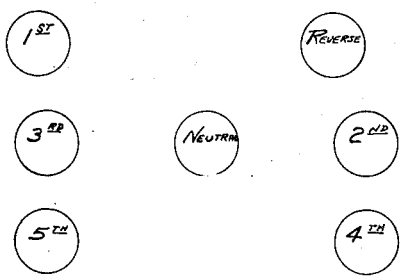
Figure 5 is a shift pattern, as seen by the operator, forward being to the right of the sheet.

When the lever extension 15 is moved to the "1st" position, as shown in Fig. 5, the lateral movement has caused the lever pin 19 to move the shift finger 23 to the right in Fig. 3 and into engagement with the first and reverse shift finger 24 which in turn engages a shift fork (not shown).

Forward and backward movement of the shift finger 23 is aided by the air assist assembly and depends on which end of the cylinder air is allowed to enter. Therefore, a description of completing a shift into first gear should be sufficient explanation for the entire shift pattern.

The entire air assister shift assembly 32 moves during the shifting action except the connecting rod 48 which is limited to up and down movement by being pivoted about a pin 66 held on a mounting bar 68 by means of a nut 110 and lockwasher 111. The mounting bar 68 is attached to the shifter housing 11 by bolts 69.

The lever 13 is bracketed in the substantially "U" shaped end 25 of a bracket 26 secured, as by a screw 27, to the operating shaft 17; thus when the lever 13 is moved rearward the operating shaft 17 turns. Secured with a screw 29 at the opposite end of the operating shaft 17 is the air valve shift arm 30 which in turn is connected to the eye bolt 31 of the air assister control rod 38 by a clevis pin 33.

The control rod 38 is provided with a hole 37 which receives a pin 35 which projects through an aperture in casing 34 and into a slot in a valve trip arm 36 to control the movement of said trip arm 36 to move it in the direction of the shift. The trip arm 36 pivots on a pin 39, and moving the lever 13 back opens the front valve 40 by means of a plunger 63 which supplies air pressure to the front port 41 of the casing 34 into the cylinder head 43. The port 40 opens into the cylinder 43 ahead of the piston 45; the air pressure thus moves the casing 34 forward.

The control rod 48 is secured to the piston 45, as with a castellated nut 46. A yoke 47, threaded on the flat headed stud 148 that is welded to the cylinder head 44, is attached to the air cylinder shift arm 49 by a clevis pin 50. Movement of the casing 34 is therefore transmitted to the shift lever shaft 51 by the air cylinder shift arm 49, the two pieces 49 and 51 being locked together by a screw 52 and a key 53, or any suitable means.

A yoke 54 on the inner end of the shift lever shaft 51, secured with a screw 55, has two ears 56 that bracket the shift finger 23. The bracket pins 20 are locked in the ears 56 by pins 57 and are pressed through holes 58 in the shift finger 23. The aforementioned movement of the shift lever shaft 51 is consequently transferred to the shift finger 23 and then to the first speed shift finger 24.

Movement of the lever 13 in the opposite direction will naturally change direction all the way through, including the opening of valve 59 by means of plunger 64 to let the air pressure through the port 60 into the cylinder 43 behind the piston 45, thereby moving the casing 34 rearward.

Piston rings 73 and a packing ring 74 maintain a seal between either side of the piston 45. The connecting rod 48 and bushing 76 are lubricated from a reservoir 112 capped by a nipple 113. An absorbent washer 114 and a seal 75 keep the cylinder 43 clear.

Shoulder bushings 77 and 78 held separated by a spring 79 are in the counterbore 130 in the casing 34. Shoulders 80, in the counterbore 130, and 180, on the control rod 38, block the bushing 77 at one end, and snap ring 81 and nut 131 block the bushing 78 at the opposite end. Nut 131 also provides the means for adjustment of the space between the bushings 77 and 78 to limit the travel of the rod 38. Thus, if the air pressure should fail or be insufficient the bushings 77 and 78 will butt together after the space between them has allowed the rod 38 to move a predetermined distance and manual shifting will again dominate.

When the resistance on the finger 24 is greater than the total resistance offered by the springs 79, 116 and 121 and the air pressure in the line 123 the air trip arm is actuated and the previously described action occurs giving air assistance to the shifting operation. When no assistance is necessary the trip arm 36 returns to neutral position.

While air is being employed the plunger 63 is down and the vertical hole 117 is sealed by the valve 40. Upon the return of the trip arm 36 to neutral spring 116 moves the plunger 63 back up to where the air pressure in the cylinder 43 can escape through the vertical hole 117 in the plunger 63 into a horizontal hole 118 that opens into the exhaust chamber 119 which is at atmospheric pressure through exhaust filter 120. At the same time another spring 121 aids in closing the valve 40 sealing off the air under pressure coming through the intake port 122 into the passage 123. A plug 124 is shown in the alternate intake port 125.

The air valve assembly 28 is secured to the casing 34 by a plurality of bolts 62.

In order to eliminate wobble of the shift lever 13 a stabilizer is used and consists of a collar 86 that rides on the crowns 87 of the ends 25 of the bracket 26. A spring 88 fits snugly around the lever 13 on the collar 86 and is held under tension by a dished washer 89 and retaining pin 90.

The shaft hole plug 91 and the resilient seal 92 prevent the ingress of dirt and foreign matter into the housing 11 and the egress of oil therefrom.

What is claimed is:

1. A gear selecting and shifting mechanism comprising in combination with a gear box cover, a gear shift lever carried by said cover for pivotal lateral and fore and aft shifting movement, shifting fingers associated with said lever, shift assisting means adjacent said cover including a casing, a piston in said casing, a source of power, a valve on said casing connected to said source of power, a first connecting means between said casing and said shifting fingers, a second connecting means interlocking said gear shift lever, said casing and said valve, said gear shift lever employing said second connecting means said casing and said first connecting means to manually shift said shifting fingers fore and aft, said second connecting means also operating said valve to provide power to move said casing on said piston to assist said fore and aft shifting movement.

2. A gear selecting and shifting mechanism comprising in combination with a gear box cover, a gear shift lever carried by said cover for pivotal lateral and fore and aft shifting movement, shifting fingers associated with said lever, an air shift assisting means adjacent said cover including a movable casing, a stationary piston in said casing, a source of air power, a valve on said casing connected to said source of air power, a first connecting means between said casing and said shifting fingers, a second connecting means interlocking said gear shift lever, said casing and said valve, said gear shift lever employing said second connecting means said casing and said first connecting means to manually shift said shifting fingers fore and aft, said second connecting means also operating said valve to provide air power to move said casing on said piston to assist said fore and aft shifting movement.

3. A gear selecting and shifting mechanism comprising in combination with a gear box cover, a gear shift lever carried by said cover for pivotal lateral and fore and aft shifting movement, shifting fingers associated with said lever, shift assisting means adjacent said cover including a casing, a piston in said casing, a source of power, a valve on said casing and connected to said source of power, a first connecting means between said casing and said shifting fingers, a second connecting means interlocking said gear shift lever, said casing and said valve, one of said shifting fingers being associated with said lever by a pin in vertical central alignment for controlling lateral selective movements and a pair of pins in horizontal central alignment with said lever pivotal point for translating longitudinal movement from said first connecting means, said gear shift lever employing said second connecting means said casing and said first connecting means to manually shift said shifting fingers fore and aft, said second connecting means also operating said valve to provide power to move said casing on said piston to assist said fore and aft shifting movement.

4. A gear selecting and shifting mechanism comprising in combination with a gear box cover, a gear shift lever carried by said cover for pivotal lateral and fore and aft shifting movement, shifting fingers associated with said lever, an air shift assisting means adjacent said cover including a casing with a cylinder formed therein, a piston in said cylinder, a source of air power, a valve on said casing and connected to said source of air power, a first connecting means between said casing and said shifting fingers, a second connecting means interlocking said gear shift lever, said casing and said valve, one of said shifting fingers being associated with said lever by a pin in vertical central alignment for controlling lateral selective movements and a pair of pins in horizontal central alignment with said lever pivotal point for translating longitudinal movement from said first connecting means, said gear shift lever employing said second connecting means, said casing and said first connecting means to manually shift said shifting fingers fore and aft, said second connecting means also operating said valve to provide air power to said cylinder to move said casing on said piston to assist said fore and aft shifting movement.

5. A gear selecting and shifting mechanism comprising, in combination with a gear box cover, a gear shift lever carried by said cover for pivotal lateral and fore and aft shifting movement, shifting fingers associated with said lever, shift assisting means adjacent said cover including a casing, a piston in said casing, a source of power, a valve on said casing and connected to said source of power, a first connecting means between said casing and said shifting fingers, including a stud, a yoke, a pin, an arm, a tubular shaft and a collar, a second connecting means interlocking said gear shift lever, said casing and said valve, said second connecting means including a control rod, connected to said casing by a pair of opposed shoulder bushings held apart by a spring, and connected to said shift lever by an eye bolt, a pin, an arm, a shaft sleeved thru said tubular shaft and a bracket, said valve being controllable by a pin interlocking it with said control rod, said gear shift lever employing said second connecting means, said casing and said first connecting means to manually shift said shifting fingers fore and aft, said second connecting means also operating said valve to provide power to move said casing on said piston to assist said fore and aft shifting movement.

6. A gear selecting and shifting mechanism comprising, in combination with a gear box cover, a gear shift lever carried by said cover for pivotal lateral and fore and aft shifting movement, shifting fingers in alignment one of which is associated with said lever, air shift assisting means adjacent said cover including a casing, a piston in said casing, a source of air power, a valve on said casing and connected to said source of air power, a first connecting means between said casing and said shifting fingers, including a stud, a yoke, a pin, an arm, a tubular shaft and a collar, a second connecting means interlocking said gear shift lever, said casing and said valve, said second connecting means including a control rod, connected to said casing by a pair of opposed shoulder bushings held apart by a spring, and connected to said shift lever by an eye bolt, a pin, an arm, a shaft sleeved thru said tubular shaft and a bracket, said valve being controllable by a pin interlocking it with said control rod, said gear shift lever employing said second connecting means, said casing and said first connecting means to manually shift said shifting fingers fore and aft, said second connecting means also operating said valve to provide air power to move said casing on said piston to assist said fore and aft shifting movement.

7. An air power-operated assister mechanism for the manual gear shifting mechanism of a selective gear transmission, said transmission including a cover with a housing mounted thereon, a shift lever extending into said housing, a power unit casing including a piston substantially centrally located within a cylinder, a control valve for said power unit, said cylinder being moveable forwardly or rearwardly by air supplied thru said control valve to said cylinder, a shift finger extending from said shift lever to gear selective mechanisms in said cover, first connecting means between said casing and said shift finger, second connecting means between said shift lever, said casing and said control valve, said shift lever being manually moved to actuate said shift finger through said first connecting means, said casing and said second connecting means and to actuate said control valve, said control valve actuating said power unit, said power unit casing moving said first connecting means, said power unit assisting said shift lever in moving said shift finger to actuate said gear selective mechanisms.

References Cited in the file of this patent

UNITED STATES PATENTS

| | | |
|---|---|---|
| 2,227,273 | Price | Dec. 31, 1940 |
| 2,323,878 | Kesling | July 6, 1943 |
| 2,339,697 | Hey | Jan. 18, 1944 |
| 2,432,712 | Bachman et al. | Dec. 16, 1947 |
| 2,520,734 | Price | Aug. 29, 1950 |
| 2,554,313 | Price | May 22, 1951 |
| 2,664,980 | Weaving et al. | Jan. 5, 1954 |
| 2,679,763 | Parsons | June 1, 1954 |